Sept. 24, 1968  A. G. ASAFF  3,402,458

METHOD OF SEALING ALUMINUM OXIDE BODIES TO METALS

Filed Sept. 29, 1964

Annis G. Asaff
Inventor
by William W. Rymer
Attorney

United States Patent Office 3,402,458
Patented Sept. 24, 1968

3,402,458
METHOD OF SEALING ALUMINUM OXIDE
BODIES TO METALS
Annis G. Asaff, Auburndale, Mass., assignor to Diamond Tool Engineering Company, Boston, Mass., a partnership
Filed Sept. 29, 1964, Ser. No. 400,052
9 Claims. (Cl. 29—470.5)

This invention relates to a method of joining bodies formed from electrical-quality aluminum oxide—whether in, for example, amorphous alumina, crystalline, or semi-crystalline form—with metal in sound and desirable seals.

It is a primary object of the invention to provide such a method in which seals of the character desired may be reproducibly and simply achieved in large-quantity production. Another major object of the invention is to make possible such achievement, if desired, of seals that are not only mechanically strong but as well are hermetic, even though involving a gold-type braze and even after much cycling in air to temperatures as high as 1000° C. The invention facilitates seals even in blind holes, and has the advantage of requiring only very thin layers of braze between the metal and the non-metallic body involved, over most of the areas of the braze-body and braze-metal interfaces.

In general, the invention features providing an aluminum oxide (of electrical quality) body and a metal element, inner surfaces of one mating with outer surfaces of the other in a relationship that in at least a portion of the cooperating areas provides a slide fit (a "slide fit" is used to refer to a fit in which with the two parts coaxial, at least some, more or less, friction exists to require a force's overcoming it if relative movement between the parts is to result, and includes what is commonly referred to as a "press fit"), providing next to and in communication with the slide fit area an enlarged zone between said inner and outer surfaces, melting braze in the enlarged zone, while holding the parts under a vacuum of at least a micron, to draw the molten braze into the slide-fit area, and then cooling.

In preferred embodiments, the invention contemplates heating by induction means to quickly and accurately bring aluminum oxide body, metal element, and braze to the desired temperature without unduly extended heating of any one of them; conducting such heating under a vacuum of 0.01 to 0.1 micron; use as braze of a ring of material disposed on the enlarged zone above referred to; providing said ring in a multiplicity of discrete portions to avoid warping and dislocation during heating; use in association with said rings of particulate braze material to facilitate heat transfer thereto; providing said slide area at a small fraction of said outer and inner surfaces, at least one of them being conical whereby said slide area additionally provides a positioning function; and use of a gold-type braze.

Other objects, features, and advantages will appear from the following description of preferred embodiments of the invention, taken together with the attached drawings, in which.

Figure 1:
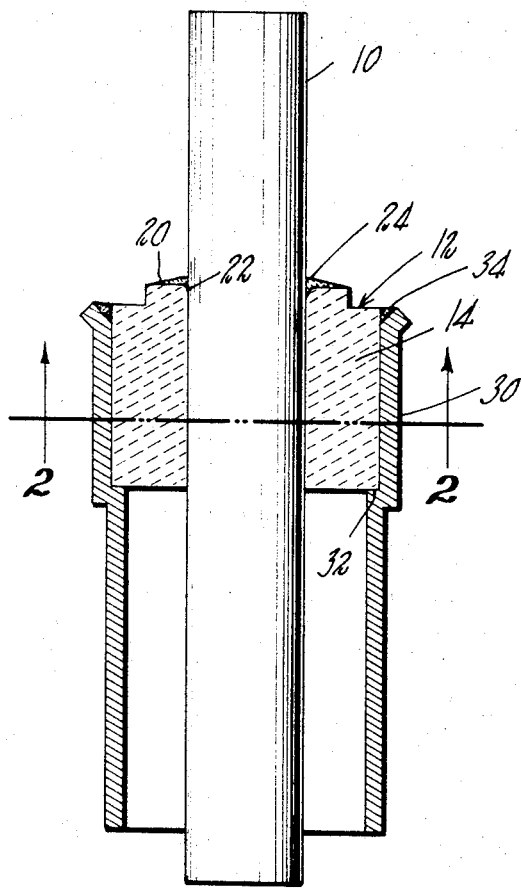
FIG. 1 is a vertical sectional view of a high-temperature feed-through terminal made by a method constituting a preferred embodiment of the invention.
Figure 2:
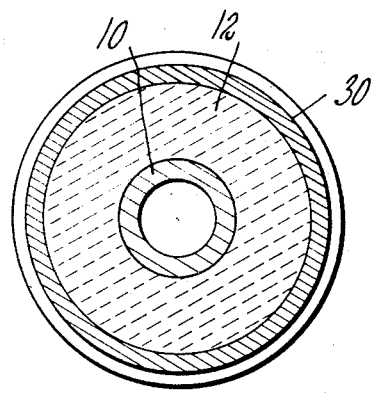
FIG. 2 is a sectional view at 2—2 of FIG. 1.

Turning now in greater detail to the drawings, there is shown in FIGS. 1 and 2 a high-temperature feed-through terminal consisting of a hollow nickel tapered tube terminal pin 10 about a half-inch long, and having a frusto-conical outside surface, the outer diameter of the pin being about 0.070 inch at its upper end and about 0.060 inch at its lower.

Figure 3:
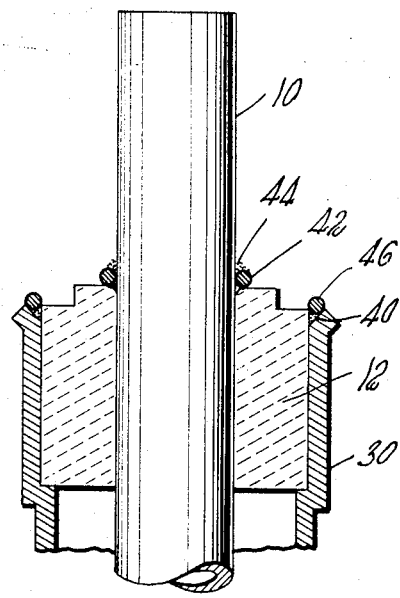
FIG. 3 is a view of the step in said method of making the embodiment of FIG. 1, just prior to melting any braze.

Surrounding the outer surface of pin 10 is the inner surface of a bead, indicated generally at 12, which is .062 to .065 inch in diameter. Forcing pin 10 into bead 12 not only produces a force fit between their respective outer and inner surfaces toward the top of the bead for brazing purposes, but because of the taper helps position the pin 10 the proper distance into bead 12. The bead 12 includes an inner body 14 of electrical-quality alumina ceramic, coated over its top surface and outside layer by a conventional sintered moly-manganese coating, over which is a layer of nickel plating, both not shown. (The entire inner, outer, and top portions of the bead may first be moly-manganese coated and nickel plated by conventional techniques, following which these layers may be removed from the outer portions of the bead top by a diamond tool.) Overall bead inside diameter in FIG. 3 is ordinarily say one to five thousandths of an inch less than the contacting diameters of the pin 10, in this embodiment. Securing pin 10 to bead 12 is braze 20, which is very thin in its bottom portions, but which is thick in the enlarged zone 22 where the fillet on bead 12 defines with pin 10 a funnel-like zone, and of greater annular area (thicker) still in horizontal cross-sections above the top of the bead, the braze being secured to the pin above the bead and the bead over the inner topmost surface well outwardly of the pin to define an external braze portion 24.

The outside diameter of bead 12 is seated slide-fittedly in nickel housing terminal 30, the bottom of the bead seated on counterbore 32. The upper end of outer terminal 30 is flared away from bead 12 to provide a funnel-like zone therebetween, and braze 34 secures terminal 30 to bead 12, the braze being very thin in its lower portions and thicker where terminal 30 is flared away from bead 12.

Practice of the method of the preferred embodiment to produce the embodiment of FIGS. 1 and 2 is shown in FIG. 3. After inspecting the bead 12 under a 90 power microscope to be sure its coating is free from cracks, washing the bead, pin, and outer terminal in xylol, rinsing them in alcohol, allowing them to dry, and assembling them into the relationship shown and decribed, the braze material is positioned as shown, preferably under a microscope.

First, 80 mesh filings 40 of Premabraze 128, an alloy of 72% Au, 22% Ni, 6% Cr manufactured by Handy and Harmon Company, Bridgeport, Conn., are placed in the flared portion of housing terminal 30, next to bead 12. Preferably this is done with a small, pointed brush, the filings having been wet with amyl acetate to facilitate handling them thus. The assembly may suitably next be set into a jig, not shown, with hole to conform with the outside dimensions of housing terminal 30. A ring 42 of Premabraze 128 (0.025 inch wire) is then placed around pin 10, and filings 44 of the same materials placed between the ring 42 and pin 10. A three-piece ring 46 of Premabraze 128 (0.013 inch wire) is placed on the filings 40. The jig is then placed under a vacuum of 0.02 micron, and heated for about three to four minutes over the high frequency heating coil of an induction furnace. The filings 40 and 44 and rings 42 and 46 melt, to form a braze unit thin between the slide-fitting portions of the bead 12 and pin 10 and housing 30, between which it flows through capillary action and by solvent action on the bead coatings, and thicker thereabove. It was particularly unexpected to find empirically that the thickest portion 24 of the braze around pin 10, above the bead 12 (limited by surface effects to the portion of the top of bead 12 carrying the layers mentioned above), greatly improved the hermetic and cycle-life quality of the inner seal. The heat is then removed, and allowing cooling to go forward under the vacuum for one hour provides desirable annealing.

The resulting device of FIGS. 1 and 2 has both inner and outer alumina ceramic to metal seals that are not only mechanically strong, but are hermetic and remain so despite cycling from −65° F. to 1000° F. It is extremely useful, for example, in high-performance headers.

Figure 4:
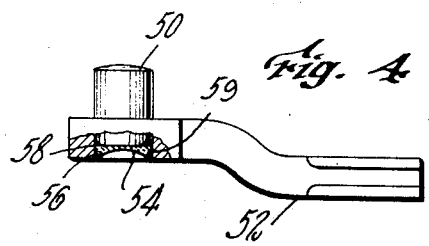
FIG. 4 is a side elevation, partially broken away, of a ruby actuator made according to a method of the invention.

The embodiment of FIG. 4 includes a ruby (crystalline aluminum oxide) 50, a stainless steel stem 52, and a braze element 54 securing the two together. The cylindrical surface of the ruby 50 is unpolished (though its spherical surface is polished for actuator contact), is about 1/16 inch in diameter, and is press-fitted into the hole of stem 52, the inside diameter of which is say a half-thousandth of an inch less than the diameter of ruby 50. In press-fitting, a blind hole 56 about 0.004 inch deep is left. A radius 58 on the ruby 50 provides a funnel-like zone adjacent the blind hole 56. In practicing further the method of the invention, this blind hole is filled with silver-copper powder, which may also be handled easily with a brush after being wet with amyl acetate. In this instance the vacuum applied is 0.05 micron, and melting occurs after about five minutes over the high-frequency coil; again cooling is for one hour without breaking the vacuum. Here the braze element 54 in the completed device includes a very thin portion between the press-fitted surfaces, merging into a thicker (greater cross-sectional area perpendicular to axis of symmetry) portion 58 in the funnel-like zone and a yet thicker portion 59 in the blind hole 56, to provide a strong and reliable joint.

Figure 5:
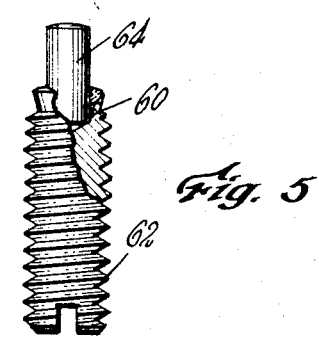
FIG. 5 is a side elevation, partially broken away, of a sapphire-tip adjusting screw made according to the invention.

In the sapphire-tip adjusting screw shown in FIG. 5, the method of the invention has been used to secure a crystalline aluminum oxide body in a blind hole 60 of steel screw 62. The sapphire 64 has an unpolished outer cylindrical surface which is press-fitted into blind hole 60 until its end rests on the bottom thereof. The upper portion of blind hole 60 is defined by a pair of frusto-conical surfaces successively upwardly flaring increasingly away from the sapphire 64, to provide together a funnel-like zone. In practicing the method, after pressing sapphire 64 into position, the funnel-like zone is filled with 80 mesh Premabraze filings in the manner already described, and after vacuum of 0.05 micron is imposed, said filings are melted (whereupon a braze element is formed which extends by virtue of the actions already described thinly between the press-fit portions of the sapphire and screw, but in greater thickness thereabove through the flared or funnel-like zone).

Other embodiments of the invention will occur to those skilled in the art and are within the scope of the following claims.

I claim:

1. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing brazing material above said zone, imposing on the whole a vacuum of at least one micron, melting said brazing material to cause the same to flow into a configuration extending from within said funnel-like zone to and between said slide-fittably mating surface portion, and cooling said whole to freeze said brazing material in that configuration.

2. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing brazing material in said zone, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration.

3. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing brazing material above said zone, imposing on the whole a vacuum of at least one micron, inductively melting said brazing material to cause the same to flow into a configuration extending from within said funnel-like zone to and between said slide-fittably mating surface portions, and cooling said whole to freeze said brazing material under vacuum in that configuration.

4. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing brazing material in said zone, imposing on the whole a vacuum of .01 to .1 micron, melting said brazing material to cause the same to flow into a configuration extending from within said funnel-like zone to and between said slide-fittably mating surface portions, and cooling said whole to freeze said brazing material in that configuration.

5. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing a ring of brazing material in said zone, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration.

6. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing a ring of brazing material in said zone, placing particulate brazing material between said ring and said metal element, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration.

7. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body, pressing said metal element and said body into slide-fitting relationship by inserting said metal element into said body, placing a radially divided ring of brazing material in said zone, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration.

8. The method of securing an aluminum oxide body of electrical quality to a metal element which comprises the steps of providing a hollow aluminum oxide body with an inner diameter, providing a metal element with an outer diameter at least as large as said inner diameter of said aluminum oxide body, providing on said body and said element a pair of cooperating brazing surfaces which adjacent the end of said body form a funnel-like zone when said element is inserted into said body, metal coating said surface of said body with moly-manganese and nickel plate, pressing said metal element and said body into slide-fitting relationship by inserting said metal element into said body, placing gold alloy brazing material above said zone, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration.

9. The method of securing an aluminum oxide body to a metal element which comprises the steps of providing a metal element with a recess having an inner diameter, providing a body of aluminum oxide with an outer diameter at least as large as said inner diameter of said metal element, providing on said element and said body a pair of cooperating brazing surfaces which adjacent the end of said body form a funnel-like zone when said body is inserted into said element, metal coating said surface of said body, pressing said metal element and said body into slide-fitting relationship by inserting said body into said element, placing brazing material in said zone, imposing on the whole a vacuum of at least one micron, melting said brazing material to cause the same to flow into a configuration extending from within said funnel-like zone to and between said slide-fittably mating surface portions, and cooling said whole to freeze said brazing material in that configuration, said configuration being thicker within said funnel-like zone.

References Cited

UNITED STATES PATENTS

| | | | |
|---|---|---|---|
| 1,974,949 | 9/1934 | Campbell | 29—470.5 |
| 2,570,248 | 10/1951 | Kelley | 29—473.1 |
| 2,686,958 | 8/1954 | Eber et al. | 29—473.1 |
| 2,835,967 | 5/1958 | Umblia | 29—473.1 |
| 2,886,687 | 5/1959 | Von Kurnatowskie et al. | 29—501 |
| 2,917,140 | 12/1959 | Omley | 29—473.1 |
| 3,055,465 | 9/1962 | Pulfrich | 29—473.1 |
| 3,065,533 | 11/1962 | Dungan et al. | 29—473.1 |
| 3,071,834 | 1/1963 | Pighini | 29—492 |
| 2,636,820 | 4/1953 | Bolton | 287—189.365 X |
| 2,739,375 | 3/1956 | Coxe. | |
| 3,063,144 | 11/1962 | Palmour | 29—504 X |
| 3,078,551 | 2/1963 | Patriarca | 29—474.4 X |
| 3,137,545 | 6/1964 | Schultz | 29—195 |
| 3,302,961 | 2/1967 | Franklin | 29—473.1 X |

JOHN F. CAMPBELL, *Primary Examiner.*

R. F. DROPKIN, *Assistant Examiner.*